United States Patent [19]

Gerber

[11] Patent Number: 4,659,114

[45] Date of Patent: Apr. 21, 1987

[54] ROTATING PIPE JOINT HAVING A FLOATING SEAL

[75] Inventor: David W. Gerber, Massillon, Ohio

[73] Assignee: The Babcock & Wilcox Company, New Orleans, La.

[21] Appl. No.: 521,518

[22] Filed: Aug. 9, 1983

[51] Int. Cl.[4] ............................................. F16L 27/00
[52] U.S. Cl. ............................................................ 285/11
[58] Field of Search ................... 285/11, 98, 280, 281, 285/DIG. 18, 278, 187, 302, 13, 165; 126/307 R, 119; 277/27, 3, 53, 216; 122/379

[56] References Cited

U.S. PATENT DOCUMENTS

| | | | |
|---|---|---|---|
| 545,268 | 8/1895 | Campbell | 285/278 |
| 1,163,941 | 12/1915 | Miller | 285/278 |
| 1,701,898 | 2/1929 | Seifert | 285/278 |
| 3,752,509 | 8/1973 | Stafford | 285/DIG. 18 |
| 4,253,435 | 3/1981 | McCandless | 277/216 |
| 4,339,108 | 7/1982 | Daniluk | 285/190 |
| 4,396,212 | 8/1983 | Honke | 285/98 |
| 4,449,738 | 5/1984 | Hotger | 285/11 |
| 4,468,056 | 8/1984 | Kramer et al. | 285/281 |
| 4,478,438 | 10/1984 | Elorriaga, Jr. | 285/98 |
| 4,498,874 | 2/1985 | Pichi | 285/305 |

FOREIGN PATENT DOCUMENTS

| | | | |
|---|---|---|---|
| 361186 | 10/1922 | Fed. Rep. of Germany | 285/278 |
| 7554 | of 1838 | United Kingdom | 285/278 |

Primary Examiner—Cornelius J. Husar
Assistant Examiner—Eric K. Nicholson
Attorney, Agent, or Firm—Robert J. Edwards; Kenneth W. Iles

[57] ABSTRACT

A floating seal for a rotating pipe joint joins two generally parallel and axially aligned pipes and provides a substantially fluid tight seal between them, while permitting relative rotation of the two pipes as well as limited relative lateral movement of the two pipes. The joint also accommodates dimensional changes, particularly in length, such as those generated by temperature change. A preferred embodiment includes a floating seal assembly having a plurality of spaced parallel circumferential grooves about the inner wall of the aperture which retain mating compression rings which are inwardly biased against the inlet pipe.

8 Claims, 5 Drawing Figures

ROTATING PIPE JOINT HAVING A FLOATING SEAL

BACKGROUND OF THE INVENTION

1. Field of the Invention

This invention relates to a rotating pipe joint, which permits two substantially axially aligned joined pipes to rotate relative to one another. More particularly, this invention relates to providing a rotating pipe joint having a floating seal which provides an acceptable seal, for operation in a severe environment.

2. The Prior Art

The present invention was developed to meet the need in the air heater industry for an effective seal assembly for sealing the fluid conveying duct to the sootblower of a Rothemuhle air heater while permitting the two joined pipes to rotate relative to one another. The invention is naturally applicable wherever a rotating joint in a hostile environment is required and a less than complete seal is satisfactory.

In a Rothemuhle air heater, the heat transfer surfaces comprise a stationary stator, which is too large to be desirably rotatable. A hood above the stator and a hood below the stator rotate in unison, connected by a single main shaft having an axial hollow rotating centering post attached at each end. Aligned rotating portions of the upper and lower hoods provide one passageway for gas through the air heater surfaces. The remaining hood portions provide another passageway. Rotating hood portions may conduct flue gas or air, depending on the needs of a particular installation. The remaining hood portions conduct whichever fluid the rotating hood portion does not conduct. As the hoods rotate, heat transfer surfaces are alternately heated by flue gas and cooled by incoming combustion air.

The flue gas deposits deleterious materials, such as carbon, fly ash, etc., onto the heat transfer surfaces, reducing their ability to transfer heat. Efficient operation and long life require periodic removal of the buildup of deleterious materials from the heat transfer surfaces. Sootblowers have long been used for cleaning air heaters while they are in service. In a Rothemuhle air heater, the sootblower is attached to the upper or lower rotating hood, or in some cases a separate sootblower is attached to each rotating hood, so it naturally rotates in unison with the rotating hood. The orifices of the sootblower are aligned to blow high pressure fluid, customarily air or dry steam, into the heat transfer surfaces of the air heater, to dislodge deleterious material which has accumulated. Typically, a single sootblower is provided on the cold side of the air heater, however, a sootblower may also be provided on the hot side. The air heater hoods rotate in the range of about 3 to about 6 rpm.

The rotating centering posts, which link the upper and lower hood to the common main shaft, and which also serve as pipes for conveying fluid to the sootblower, must be connected to a stationary inlet pipe and the rotating joint between them must accommodate this rotation while providing an acceptable seal. The joint must survive in the hostile environment of the air heater where temperatures of 650° F. or more are typically encountered. In addition, the rotating joint is inaccessible while the air heater is in service, and is difficult to reach in any event.

The prior art attempted to solve this problem by providing a sliding seal between the rotating centering post and the stationary inlet pipe. Generally, the sliding seal comprises a spring loaded joint having two hardened steel superposed rings, resiliently urged against one another by the springs, that rotatably slide relative to one another. The sliding seal, however, is susceptable to several difficulties. First, the area of the wear surfaces of the rings is relatively small and cannot be readily increased by redesign due to the overall configuration of the sliding seal. This leads unalterably to a relatively short service life; sliding seals often wear out after only three months of service and rarely last more than a year. Second, the sliding seal, despite the adjustability of the spring tension, cannot accommodate all the axial thermal growth of the main shaft and the rotating centering post, which may be as much as two inches. Typically, a standard expansion joint has been used on the end of the rotating centering post to accommodate much of this growth. In this usage, the standard expansion joint is subject to frequent failure. Third, the biasing springs which hold the rings in contact with each other must be preset to a certain tension unique to each air heater after installation in the field, to help properly accommodate the centering post and main shaft growth and provide sufficient pressure on the rings to make a good seal. This crucial adjustment requires skilled labor both to predict the required adjustment and to make the adjustment, but remains more art than science. This adjustment has a substantial effect on the life of the sliding seal but the accuracy of it is not known until failure of the seal. Fourth, the sliding seal cannot compensate for axial misalignment of the rotating entering post and the stationary inlet pipe. These two pipes are frequently misaligned or become so as the air heater wears. In this case, the rings of the sliding seal wear eccentrically instead of evenly, drastically shortening the life of the sliding seal, i.e., adequate pressure cannot be maintained within the sootblower system under normal operating conditions because one or both rings will wear completely through along some portion of its surface. If the system is being blown with steam, leaking steam can cut the pipe further, resulting in a complete loss of pressure.

The air heater is most conveniently removed from service for maintenance during regularly scheduled boiler maintainance, typically scheduled once a year. If the air heater must be removed from service while the boiler is operating, as is required if the sootblower fails because the sliding seal or the expansion joint fails, several undesirable effects occur. The air heater must be allowed to cool, which increases downtime. Valuable sensible heat of the flue gas is wasted since flue gas must bypass the air heater. Skilled workers must enter the air heater, discern the cause of the sootblower failure, and replace defective parts. The sliding seal may cost several thousand dollars, and the additional costs incurred in an unscheduled shutdown of the air heater make failure of the sliding seal especially expensive and undesirable.

Thus, a need exists for a rotating pipe joint which overcomes these and other difficulties associated with the prior art, which can be manufactured and sold at a reasonable price.

SUMMARY OF THE INVENTION

Accordingly, it is the primary object and the purpose of the present invention to provide a rotating pipe joint for joining two substantially axially aligned pipes that is capable of extended service in a hostile environment such as that found in an air heater.

It is another object of the present invention to provide a rotating pipe joint which is adaptable to thermal growth in its joined pipe members and eliminates the need for any other means of accommodating axial thermal growth.

It is another object of the present invention to provide a rotating pipe joint that permits relative lateral movement of the two joined pipes.

It is a further object of the present invention to provide a rotating pipe joint that does not require any adjustments or settings in the field.

It is a further object of the present invention to provide a rotating pipe joint that is relatively easy and inexpensive to manufacture.

These and other objects of the invention are achieved in accordance with the present invention, by a rotating pipe joint that includes a housing, an inlet pipe inserted through the upper end of the housing, means for substantially sealing the joint between the inlet pipe and the housing located within the housing and disposed to permit movement of the inlet pipe relative to the housing, with the inlet pipe being inserted into the sealing means, and an outlet pipe fixedly attached to the lower end of the housing. The present invention further comprises a sealing means including a floating seal element enclosed within the housing, the floating seal element including a collar having a central cylindrical aperture therethrough whose center line is the axial center line of the collar, for receiving the inlet pipe, the aperture and the pipe being sized to mate closely enough to substantially seal the joint. In a preferred embodiment, the sealing means further comprises a floating seal element enclosed within the housing, the floating seal element including a collar having a plurality of spaced parallel circumferential grooves about the interior aperture of the collar, and a plurality of compressing rings resiliently biased against the inlet pipe and seating in corresponding said grooves.

DETAILED DESCRIPTION OF THE PREFERRED EMBODIMENT

Figure 1:
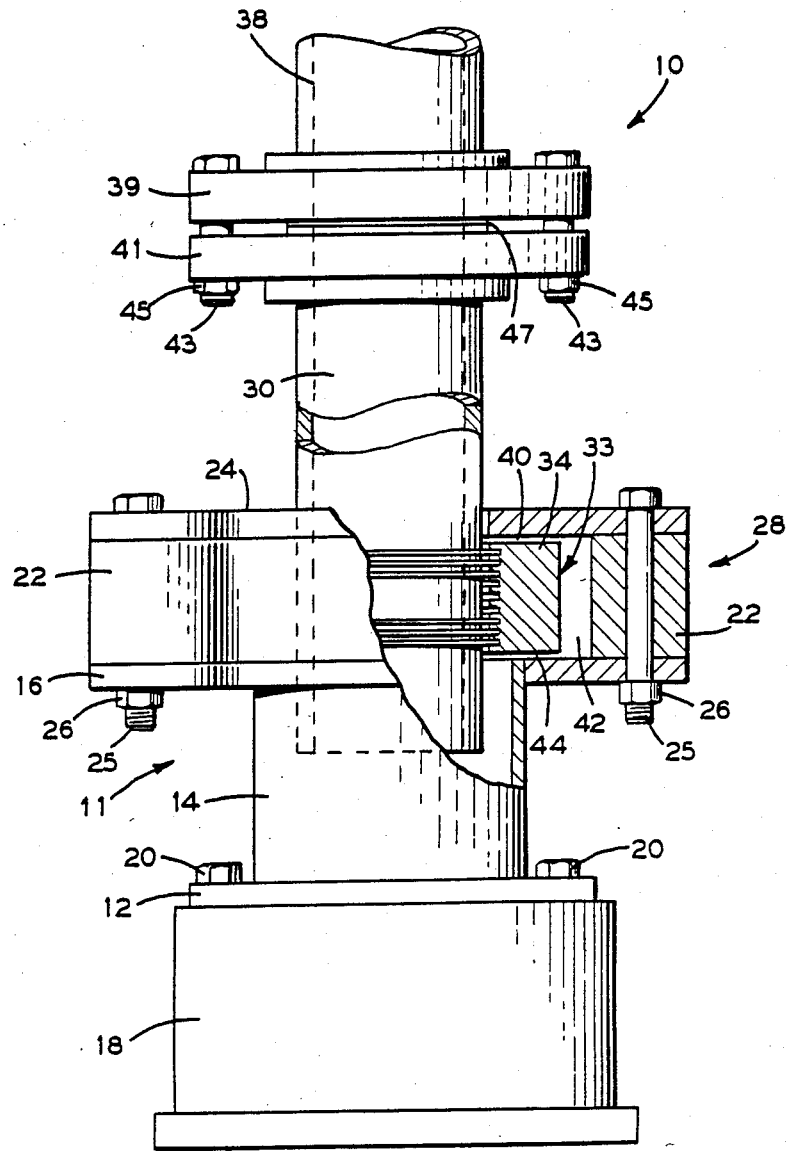
FIG. 1 is a side elevation in partial cross-section of a preferred embodiment of the rotating pipe joint having a floating seal according to the present invention.

Referring to FIG. 1, rotating pipe joint 10 includes spool piece base 12 fixedly attached to rotating centering post 18 by suitable fasteners such as bolts 20 which are desirably evenly spaced about the circumference of rotating centering post 18, support 14, fixedly attached to base 12, and flange 16, fixedly attached to support 14, which supports spacer plate 22 of right circular cylindrical configuration. Base 12, support 14, and flange 16 are suitably attached to one another such as by welding to form spool piece 11. Resting on the top of spacer plate 22 is thrust plate 24. Suitable fasteners such as studs 25 and nuts 26 effectively secure flange 16, spacer plate 22, and thrust plate 24 together to comprise housing 28, which naturally rotates with centering post 18. Thrust plate 24 includes a centrally disposed aperture through which slide pipe 30, which may advantageously be polished stainless steel for long life due to corrosion resistance or other suitable material, is inserted. Flange 16 likewise includes an aperture which is penetrated by slide pipe 30.

Housing 28 encloses floating seal 33 comprising collar 34, which in a preferred environment is a right circular cylindrical collar whose central aperture fits snuggly along slide pipe 30. The outer diameter of collar 34 is substantially less than the inside diameter of the preferably right circular cylindrical housing 28 and thrust plate 24 aperture and flange 16 aperture have substantially greater diameter than the diameter of slide pipe 30, thereby permitting relative lateral movement of stationary inlet pipe 38 and rotating centering post 18. In a preferred embodiment, these arrangements provide for a lateral movement on the order of $\frac{3}{4}$-$1\frac{1}{2}$ inches from the vertical centerline of the two pipes, although the extent of permitted lateral movement is a design choice.

As viewed in FIG. 1, the height of collar 34 is less than the height of inner chamber 42 of housing 28, thereby providing gaps 40 and 44 between the upper radial surface of collar 34 and housing 28. In operation, when the pipe is pressurized, the upper radial surface of collar 34 is thrust upwardly against thrust plate 24 thereby substantially eliminating gap 40, while enlarging gap 44 between the lower radial surface of the collar 34 and flange 16 of the housing 28. The mating of the upper radial surface of collar 34 and the lower surface of thrust plate 24 substantially seals the entire joint. All parts of the rotating pipe joint may be made from any suitable material, such as nonhardenable carbon steel. In a preferred embodiment, thrust plate 24 and collar 34 are made of a heat treatable hardenable steel alloy, which is surface hardened. Mating surfaces of thrust plate 24 and collar 34 are machined smooth, e.g., a 125 surface finish is acceptable, since in service these mating surfaces wear to fit.

In operation, most relative rotation occurs between collar 34 and slide pipe 30, since collar 34 tends to stick to thrust plate 24, which naturally rotates with rotating centering post 18, regardless of which embodiment, subsequently described, of collar, is used. From time to time, the seal may be temporarily lost as collar 34 loses contact with thrust plate 24, a condition cuased by poor axial alignment of rotating centering post 18 and slide pipe 30, thereby permitting excessive fluid leakage from the aperture in thrust plate 24, but this condition is self-correcting and an effective seal is usually restored in less than one revolution. A pressure of only about 10 lbs. per square inch of air or steam is required to seal the joint, whereas in actual operation in the application to sootblowing, these fluid pressures are on the order of 70-120 lbs. per square inch. Leakage of the seal is insufficient to interfere significantly with sootblowing and is less than about 5% of the volume of fluid being blown. That volume depends on the size of the air heater but illustratively would be approximately 1700 scfm of air or 4320 lbs./hr. of dry steam for a 7.5 m. diameter air heater, or approximately 4400 scfm of air or 11,340 lbs./hr. of dry steam for a 16 m. diameter air heater. The inside diameter of collar 34 is less than the diameter of the aperture portion of the lower surface of flange 16 aperture, which forces collar 34 upwardly to mate with thrust plate 24 when stationary inlet pipe 38 is pressurized. The rotating pipe joint works in any orientation; e.g. as illustrated in FIG. 1, or inverted from that orientation.

Rotating centering post 18 grows along its center line due to thermal expansion. This growth may be on the order of one to two inches. Spool piece 11 naturally moves upwardly when centering post 18 grows. The entire joint 10 including floating seal 33 merely slides upwardly along slide pipe 30 to accommodate this thermal expansion of rotating centering post 18. Because the diameter of slide pipe 30 is smaller than the diameter of rotating centering post 18, slide pipe 30 can slide into rotating centering post 18, thereby compensating for all thermal growth of rotating centering post 18 and eliminating any need for standard expansion joints along the axis of slide pipe 30 or rotating centering post 18.

Slide pipe 30 facilitates sealing between the pipe and collar 34, by providing smooth mating surfaces which wear to fit as slide pipe 30 slides up and down in collar 34 in response to thermal growth of rotating centering post 18. Slide pipe 30 is conveniently attached to stationary inlet pipe 38 by matching flanges 39, 41 welded to their respective members, secured to one another by a plurality of studs 43 and nuts 45, and substantially sealed by gasket 47.

Figure 2:
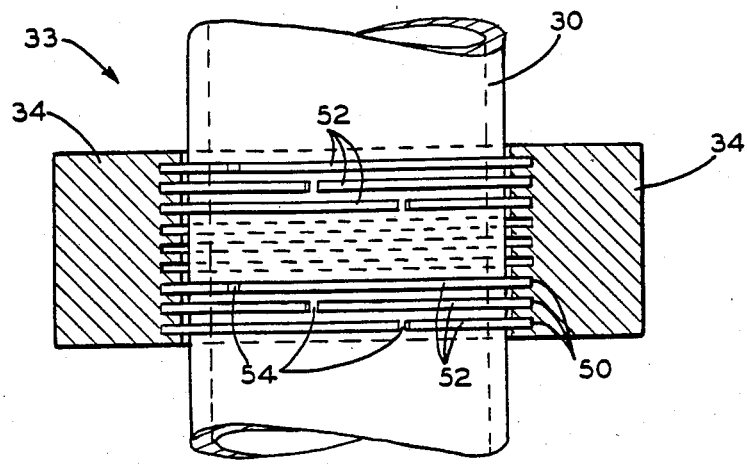
FIG. 2 is a side elevation of the floating seal assembly of the rotating pipe joint of FIG. 1.

Referring to FIG. 2, an enlargement of the preferred embodiment of the rotating pipe joint of FIG. 1, floating seal 33 comprises collar 34 which includes a plurality of spaced parallel circumferential grooves 50 in the sidewall of the aperture. A plurality of compression rings 52 is seated in some of corresponding grooves 50, which are inwardly biased against slide pipe 30 to improve the seal between collar 34 and slide pipe 30. Gaps 54 formed at the two ends of each ring 54 are staggered as illustrated in FIG. 2 to further improve the quality of the seal. In the preferred embodiment illustrated in FIG. 2, a set of three rings 52 is located toward the lower portion of collar 34, and a second set of three rings 52 is located toward the upper portion of collar 34. Nine grooves 50 are provided as shown in FIG. 2. Naturally, the number and precise spacing of rings 52 and grooves 50 may be varied to meet the needs of a particular application.

Figure 3:
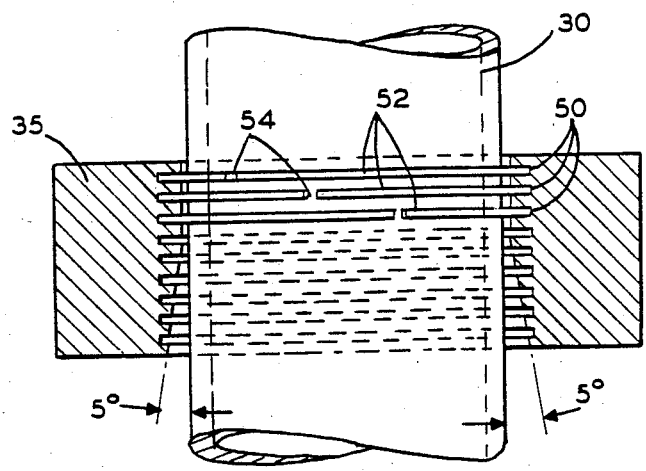
FIG. 3 is a side elevation of another embodiment of the floating seal assembly shown in FIG. 2.
Figure 4:
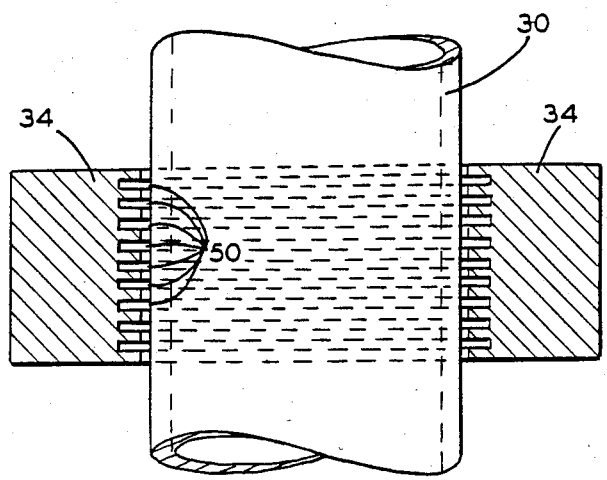
FIG. 4 is yet another alternative embodiment of the floating seal assembly as illustrated in FIG. 2.

In another preferred embodiment, illustrated in FIG. 4, grooves 50 have no rings 52, and comprise a labyrinth seal, in which a small fluid pressure drop occurs across the width of each groove, thereby providing a seal whose effectiveness increases as the number of grooves 50 increase. As illustrated in FIGS. 1-4, the collar includes nine grooves 50. It has been found that a collar, 35 (FIG. 3) incorporating both rings 52 and a labyrinth seal composed at grooves 50 without rings 52 provides a better seal than a collar 34, (FIG. 4) having only one sealing mechanism, although either system discribed will provide an adequate seal alone. The combination of rings 52 and labyrinth grooves 50 is illustrated in the preferred embodiment of FIGS. 2 and 3.

In a further preferred embodiment illustrated in FIG. 3, the inner aperture of collar 35 is tapered and includes a set of three rings 52 in grooves 50 along the upper portion of tapered collar 35 while the lower portion of the aperture in tapered collar 35 tapers upwardly from the bottom of tapered collar 35 to about the midpoint of its height. In a preferred embodiment, the taper is about 5°, although tapers of 3° to 15° are also acceptable. Tapered collar 35 permits further movement between slide pipe 30 and rotating centering post 18, namely that slide pipe 30 can pivot about a point on its axis, that is, slide pipe 30 can toggle without an adversely affecting the seal. Tapered collar 35 seals more effectively when it also incorporates a labyrinth seal, discussed above, and six grooves 50 without rings 52 provides an acceptable seal.

Figure 5:
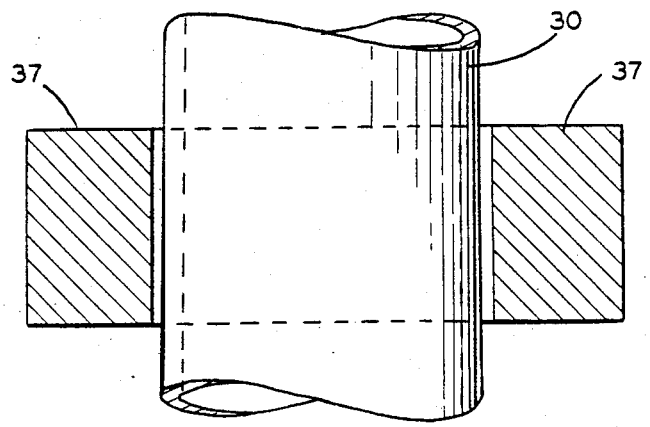
FIG. 5 is yet another alternative embodiment of the floating seal assembly as illustrated in FIG. 2.

As illustrated in FIG. 5, collar 37 may be provided with a smooth bore aperture, i.e., without grooves or rings, which slides over slide pipe 30. Such a collar 37 does not seal as well as collar 34 or tapered collar 35 but may provide a satisfactory and acceptable seal. Naturally, collar 37 may also be provided with a tapered aperture like that of tapered aperture 35 in FIG. 3.

Joints according to the present invention are capable of providing good service in hostile environments, where high speed rotation and perfect sealing of fluids are not required. While the invention has been described with particular regard to a number of preferred embodiments and its application in Rothemuhle air heaters has been illustrated, it is not intended that the invention be limited to the precise embodiments disclosed since modifications and variations falling within the scope of the invention may occur to those skilled in the art. Rather, the scope of the invention should be measured by the claims that follow.

I claim:

1. A pipe joint assembly for sealably connecting two axially aligned pipes for conveyance of pressurized fluid therebetween, one of the pipes rotating with respect to the other, comprising:

a stationary inlet pipe;
   a slide pipe having a first end portion fixed to the stationary inlet pipe and a second end portion opposite the first end;
   a floating seal mounted on the slide pipe, the floating seal being axially and rotatably moveable relative to the slide pipe, the floating seal having a pair of opposed radial surfaces thereon;
   compression ring means disposed between the floating seal and the slide pipe and substantially circumferentially bearing against the slide pipe at a plurality of axially spaced intervals for holding the floating seal to the slide pipe;
   a rotatable housing including wall means defining a chamber therein which receives the second end portion of the slide pipe and said floating seal in the chamber;
   a rotatable post fixed to the housing for rotation therewith;
   means for passing the pressurized fluid from the stationary inlet pipe through the slide pipe from the first end portion to the second end portion and into the chamber which pressurizes the chamber and the rotatable post; and
   one of the radial surfaces of the floating seal facing the housing and being spaced therefrom when the chamber is depressurized which forms a gap therebetween and the opposed one of the radial surfaces of the floating seal being exposed to the pressurized fluid during operation of the assembly when the chamber is pressurized so that the floating seal moves relative to the slide pipe due to the pressurized fluid to close the gap between said housing and said one of the radial surfaces.

2. A pipe joint assembly as set forth in claim 1, the second end portion of the slide pipe being spaced from the housing to accommodate relative axial movement therebetween.

3. A pipe joint assembly as set forth in claim 2, wherein the floating seal includes an outer peripheral surface intermediate the opposed radial surfaces, the outer peripheral surface being spaced from the housing to provide a radial space therebetween.

4. A pipe joint assembly as set forth in claim 1, wherein the floating seal comprises a cylindrical collar which includes an inner diametrical surface adjacent the slide pipe having a multiplicity of parallel grooves and wherein the compression ring means comprises a plurality of compression rings in at least some of the grooves and in slidable contact with the slide pipe.

5. A pipe joint assembly as set forth in claim 4, wherein the multiplicity of grooves comprises nine grooves and the compression ring means comprises three compression rings mounted within three adjacent grooves.

6. A pipe joint assembly as set forth in claim 5, wherein the compression ring means comprises a first set of three compression rings mounted within three adjacent grooves and a second set of three compression rings mounted within three adjacent grooves spaced from the first set by three adjacent grooves.

7. A pipe joint assembly as set forth in claim 6, where each of the compression rings includes two opposite ends closely spaced from each other to form a gap therebetween, each gap of compression rings in adjacent grooves being circumferentially staggered relative to each other and the slide pipe.

8. A pipe joint assembly as set forth in claim 1, wherein the housing comprises a spool shaped piece and means for removably connecting the spool shaped piece to the rotatable post.

* * * * *